Feb. 16, 1943.  E. WILDHABER ET AL  2,311,302
DRESSING MECHANISM
Filed Nov. 13, 1939  9 Sheets-Sheet 1

Inventor
ERNEST WILDHABER
AND
LEONARD O. CARLSEN
By
*B.E.Schlesinger*
Attorney

Feb. 16, 1943.   E. WILDHABER ET AL   2,311,302
DRESSING MECHANISM
Filed Nov. 13, 1939   9 Sheets-Sheet 3

INVENTOR
ERNEST WILDHABER &
BY LEONARD O. CARLSEN
ATTORNEY

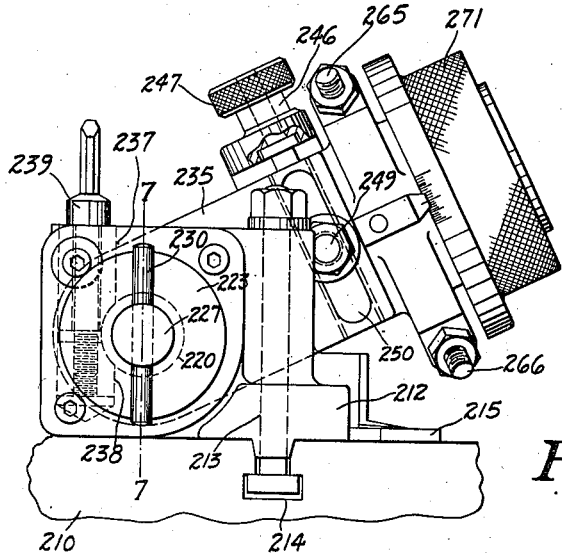
Fig. 6
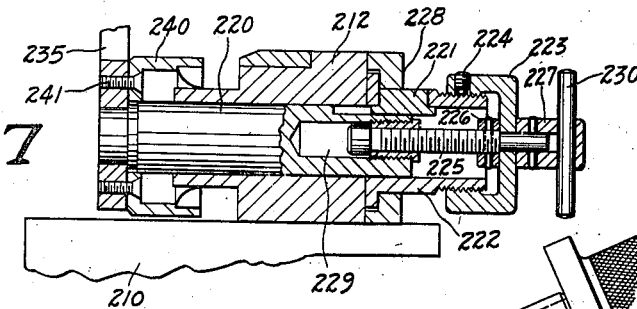
Fig. 7
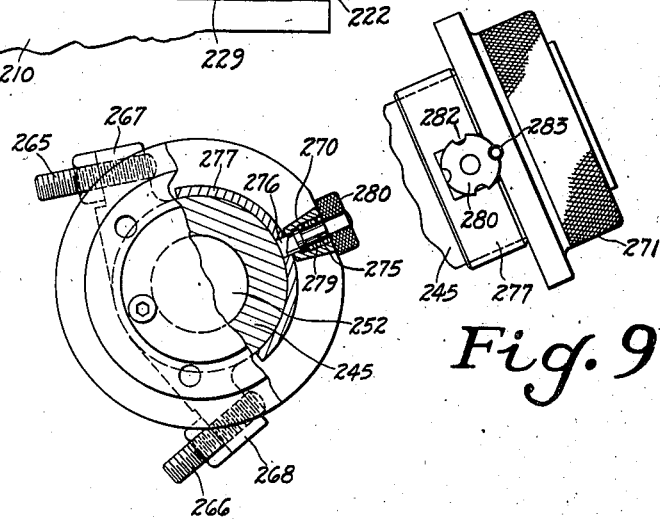
Fig. 8
Fig. 9

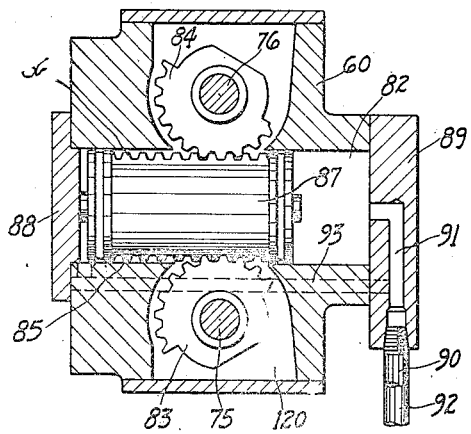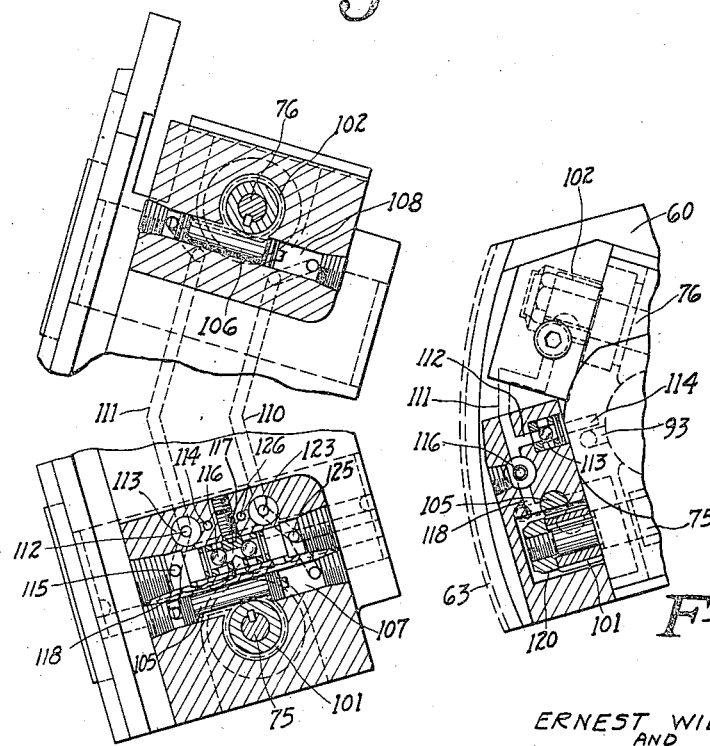

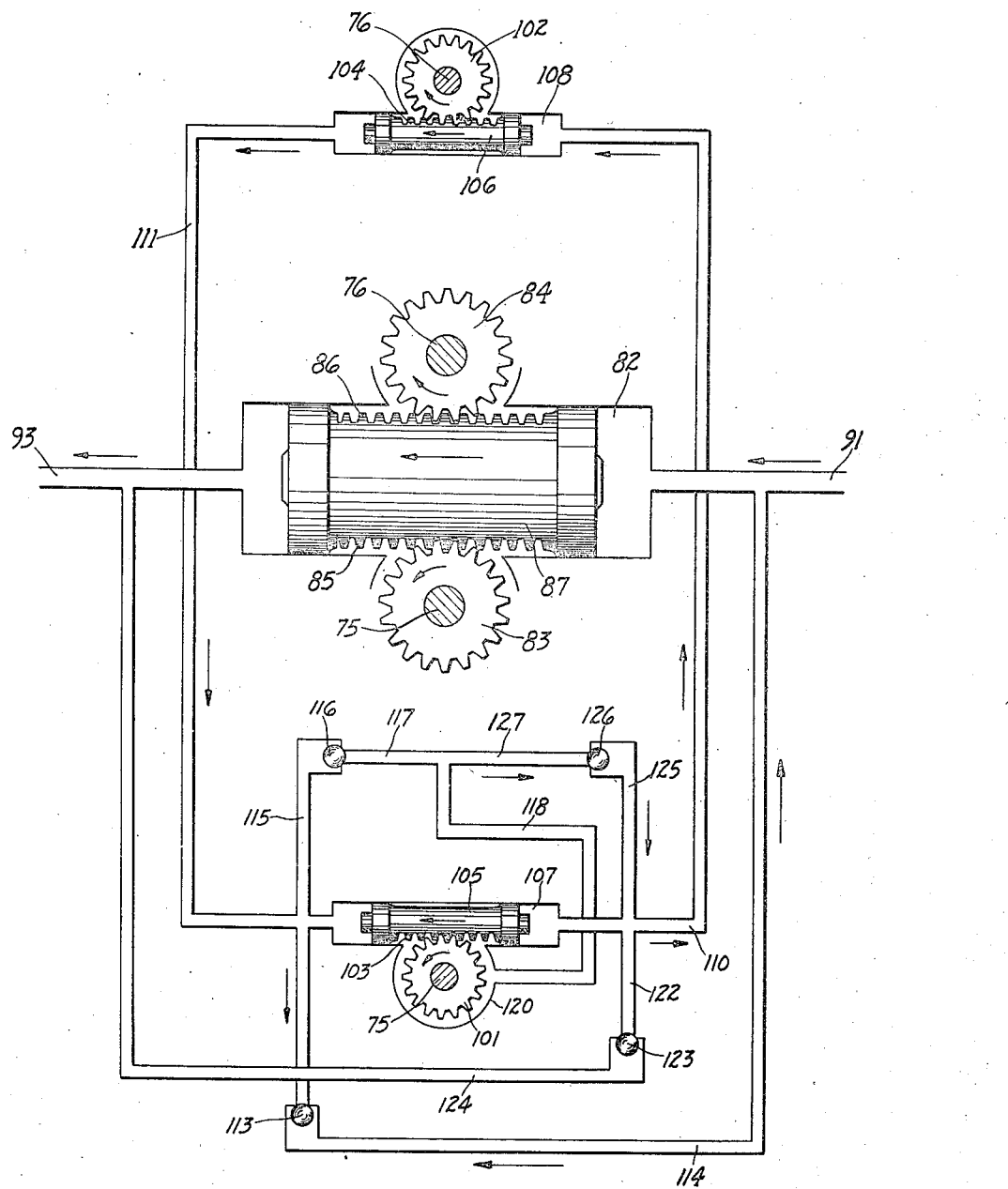

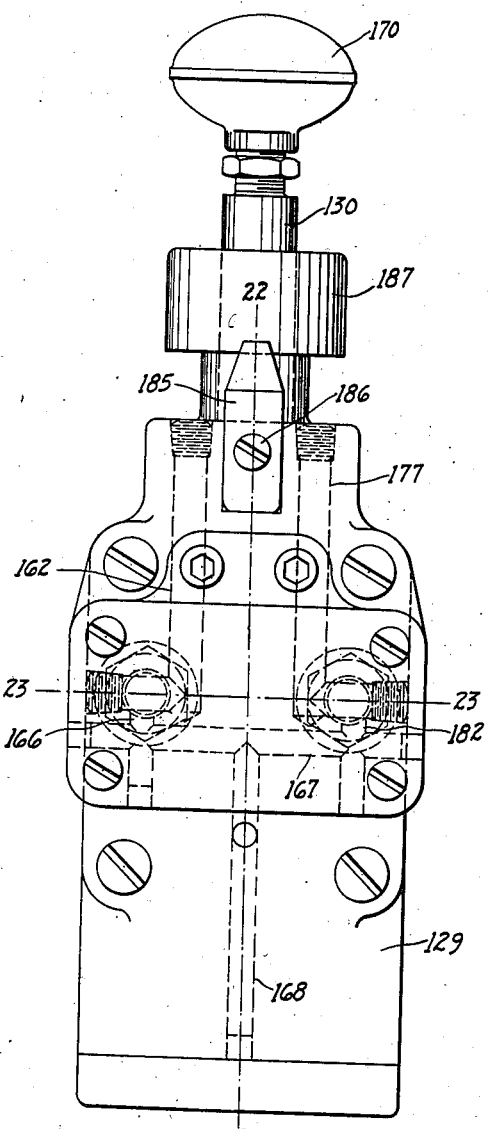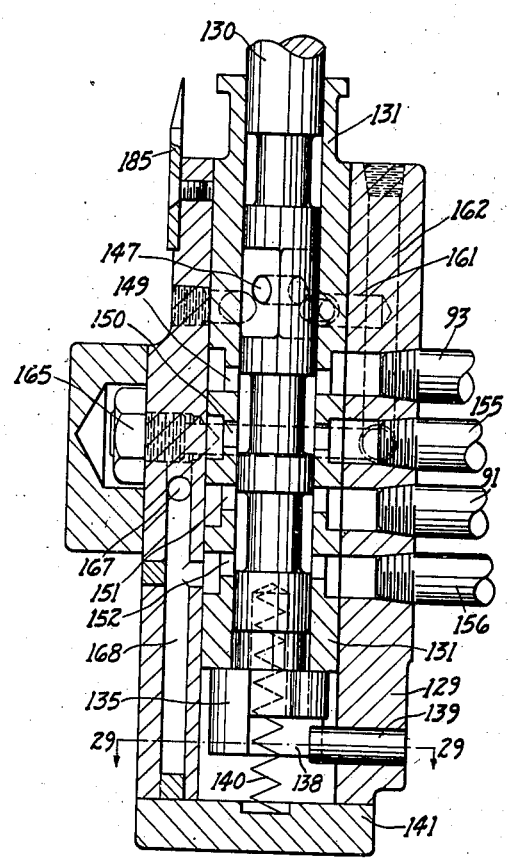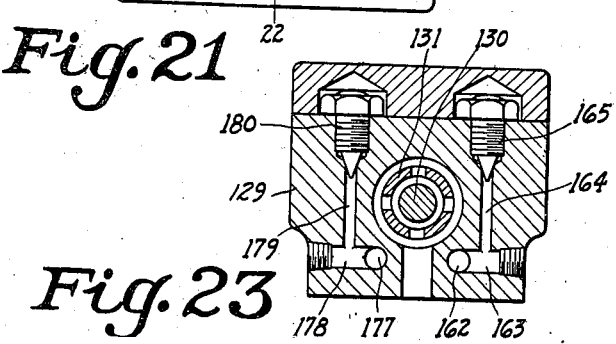

Feb. 16, 1943.　　E. WILDHABER ET AL　　2,311,302
DRESSING MECHANISM
Filed Nov. 13, 1939　　9 Sheets-Sheet 9

INVENTOR
ERNEST WILDHABER &
BY LEONARD O. CARLSEN
ATTORNEY

Patented Feb. 16, 1943

2,311,302

UNITED STATES PATENT OFFICE 2,311,302

DRESSING MECHANISM

Ernest Wildhaber, Brighton, and Leonard O. Carlsen, Rochester, N. Y., assignors to Gleason Works, Rochester, N. Y., a corporation of New York Application November 13, 1939, Serial No. 304,150

13 Claims. (Cl. 125—11)

The present invention relates to dressing methods and mechanisms and particularly to a method and mechanism for dressing wheels for grinding gears. In a specific aspect, the invention relates to a method and mechanism for dressing grinding wheels of the type employed for the grinding of spiral bevel and hypoid gears in a generating operation.

Ordinarily in grinding generated spiral bevel and hypoid gears, a grinding wheel is employed that has side surfaces of straight profile inclined to the axis of the wheel at angles equal to the pressure angles of the tooth surfaces of the gear being ground. Such a wheel may represent a basic crown gear or the mate of the gear being generated. In grinding the tooth surfaces of spiral bevel and hypoid gears, however, the problem of producing a satisfactory tooth surface bearing or contact is presented. Spiral bevel and hypoid gears must have a tooth bearing or contact that is properly located lengthwise and on the profiles of the mating tooth surfaces and the bearing itself must be of proper length and height otherwise the gears are bound to be noisy and to wear. It has been discovered that the shape of the tooth bearings on ground spiral bevel and hypoid gears can be controlled by modifying the profile shape of the grinding wheel. So-called "arrow-head," "diamond," "half-moon" and other types of tooth bearings can be eliminated by using grinding wheels dressed to convex or concave profile shapes.

The bottoms of the tooth spaces of spiral bevel and hypoid gears used in automotive drives are not ground. It is only the sides of the teeth that are ground because it is only the side surfaces of a gear that are in contact with the mate gear. Heretofore, then, it has only been necessary to consider the shapes of the sides of the grinding wheel in the dressing operation. Longitudinally curved tooth tapered gears have recently been introduced into the aeroplane field, however. With such gears it has been found necessary to grind the bottoms as well as the sides of the teeth. This is to prevent possible formation of cracks at the junctures of the sides with the bottoms of the tooth spaces. Aeroplane gears are heavily loaded anyway to keep their size and therefore their weight at a minimum and if the junctures of the bottom with the sides of a tooth space are not smooth, cracks tend to form at such junctures when the gears are under load, causing eventual failure of the gears. In grinding the teeth of aeroplane gears, care must be exercised also that the ground bottom surfaces blend with the ground side surfaces to form smooth, uninterrupted surfaces. Moreover, for maximum strength, proper fillet radii must be formed at the juncture of the sides with the bottoms of the tooth spaces. The grinding wheels, then, must be properly dressed.

One object of the present invention is to provide a dressing mechanism which may be employed to dress either a straight or a curved profile on a grinding wheel and, in the case of a curved profile, either a concave or a convex shape.

Another object of the invention is to provide a dressing mechanism employing two dressing tools for dressing opposite side surfaces of a grinding wheel in which the two dressing tools may be actuated simultaneously from a single source of power to dress the two side surfaces of the wheel simultaneously.

A further object of the invention is to provide a dressing mechanism in which the dressing tool may be actuated by a rack and pinion and in which means is provided for taking up back-lash between the rack and pinion so as to insure smooth uniform movement of the dressing tool across the surface being dressed.

Another object of the invention is to provide a dressing mechanism having means for controlling the rate of movement of the dressing tool so that the rate of movement may readily be adjusted to obtain a faster movement of the dressing tool in dressing of a wheel prior to a rough grinding operation from that employed in dressing a wheel prior to a finish-grinding operation.

A further object of the invention is to provide a dressing mechanism having means for dressing a round on a grinding wheel at the juncture of a side and the tip surface of the wheel so that a wheel may be provided which will be able to grind smooth sides and bottoms in the tooth spaces of a gear without any sharp corners at the junctures of the sides with the bottoms.

Still another object of the invention is to provide a dressing mechanism for simultaneously dressing the top of a grinding wheel and the rounds at the junctures of top with opposite sides of the wheel by a single swinging movement of a single dressing tool.

A still further object of the invention is to provide a method of dressing the side surfaces of a grinding wheel which will permit of using swinging dressing tools to dress different shapes on the sides of the wheel simply by adjustment of the axes of swing of the dressing tools relative to the sides of the wheel to be dressed.

Other objects of the invention will be apparent hereinafter from the specification and from the recital of the appended claims.

The present application is limited to the side dressing mechanism of the present invention. The end dressing mechanism is covered by the pending application of Leonard O. Carlsen, Serial No. 454,405, filed August 11, 1942.

In the drawings:

Fig. 6 is an elevational view of the end dressing mechanism and its support, the view being taken looking in the direction of the arrow 6 of Fig. 3.

Fig. 7 is a sectional view through the support taken on the line 7—7 of Fig. 6;

Fig. 8 is an elevational view looking in the direction of the arrow 8 of Fig. 3, parts being broken away;

Fig. 9 is a fragmentary elevational view, showing particularly the knurled knob for operating the end dresser and the stop for limiting its motion;

Fig. 10 is a developed sectional view on a somewhat enlarged scale taken on the line 10—10 of Fig. 2;

Fig. 11 is a developed sectional view also on an enlarged scale and taken approximately on the line 11—11 of Fig. 2;

Fig. 12 is a part sectional, part elevational view taken at right angles to the view of Fig. 11;

Fig. 13 is a diagrammatic view illustrating the principle of operation of the mechanism for actuating the side dressers and of the back-lash take-up mechanism therefor;

Fig. 21 is a side elevational view of the hydraulic control valve for the side dressers;

Fig. 22 is a sectional view on the line 22—22 of Fig. 21;

Fig. 23 is a section on the line 23—23 of Fig. 21 but on a somewhat reduced scale;

Figure 1:
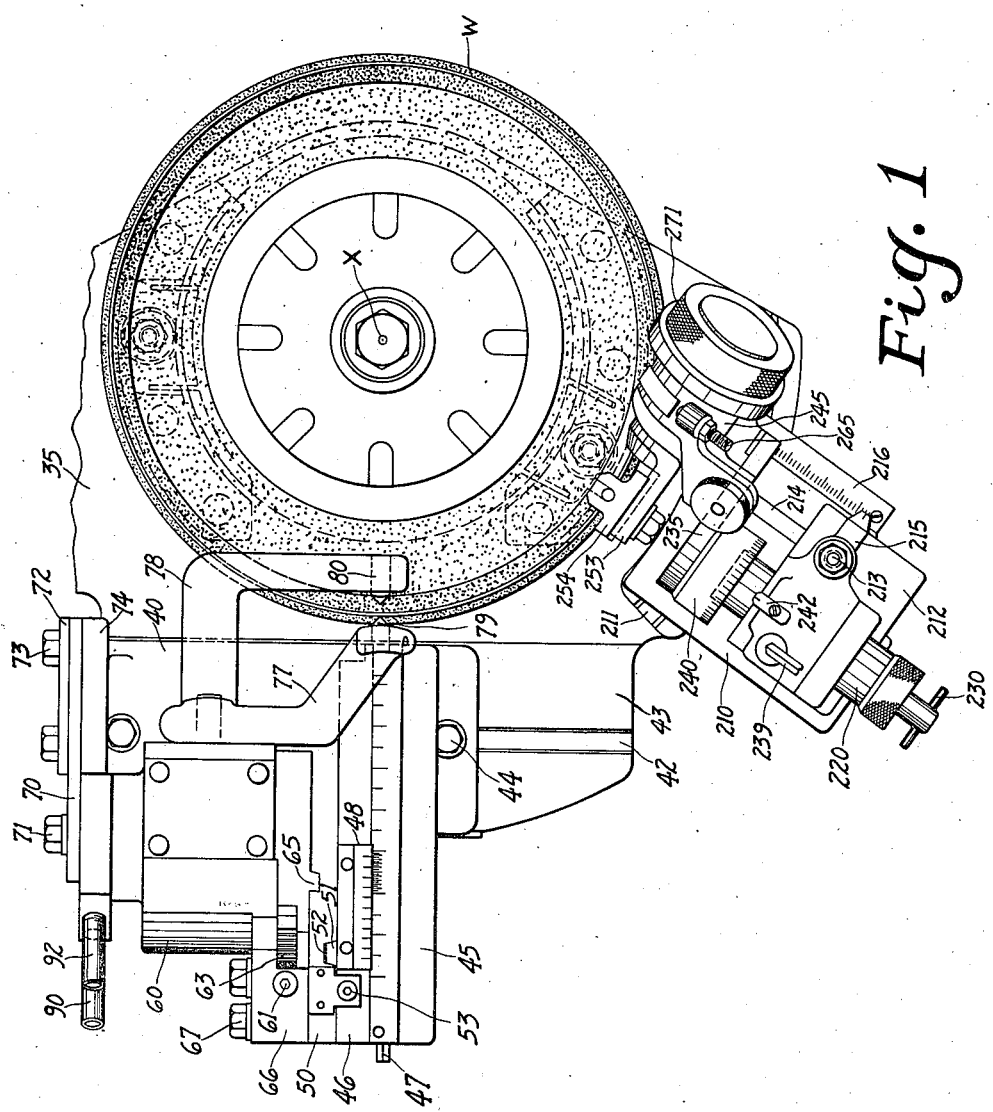
Fig. 1 is an elevational view, looking at the wheel end of a spiral bevel gear grinding machine of known construction and showing a dressing mechanism constructed according to one embodiment of the present invention mounted thereon.

In dressing the profile shape of the grinding wheel, this invention is based on the discovery that by varying the position of the axis of swing of a dressing tool relative to the grinding wheel the same tool may be used to dress a substantially straight profile shape or a convex or a concave surface on a side of the grinding wheel. When the dressing tool is swung about an axis perpendicular to a plane tangent to the side of the wheel at the point of contact of the dressing tool and wheel, an approximately straight surface can be dressed on the wheel, while when the dressing tool is positioned so that its axis of swing is inclined at an acute angle to said tangent plane, a concave surface will be dressed on the wheel, and, when the dressing tool is positioned so that its axis of swing is inclined at an obtuse angle to said tangent plane, a convex surface will be dressed on the wheel. In the dressing of the tip of the wheel, this invention is based on the discovery that if the dressing tool is swung about a fixed axis and this axis is positioned so as to be inclined to the tip of the wheel and to a plane containing the axis of the wheel, the dressing tool, even though moved in a circular arcuate path, will dress the tip of the wheel to a shape which in an axial plane of the wheel will be approximately elliptical and blend satisfactorily with the side surfaces of the wheel.

In the dressing mechanism illustrated in the drawings, separate dressing tools are used for the two sides and the tip of the wheel. Each of these tools is mounted on a swinging arm and the dressing of each surface is effected by oscillation of this arm. Thus in the dressing of each surface of the wheel, the dressing tool is moved back and forth in a circular arc across the surface being dressed.

The arms carrying the side dressing tools are journaled in a support which is adjustable both axially and radially of the wheel in accordance with the height and the diameter of the wheel to be dressed. These two adjustments are rectilinear adjustments. In addition this support has a third rectilinear in a direction at right angles to the first two. This third adjustment permits of varying the amount of offset of the axis of swing of the dressing tools from the axis of the grinding wheel. Through this adjustment, the inclination of the axis of swing of each side dressing tool may be varied relative to a plane tangent to the side surface of the wheel at the point of contact of the side dressing tool with the wheel surface.

When the dressing tool support is so positioned that the axis of swing of a side dresser is perpendicular to the tangent plane, the tool will dress a surface on the side of the wheel whose profile shape departs so little from a straight line that the departure is entirely negligible and to all intents and purposes the wheel has a straight profile. When the support is so positioned that the axis of swing of a side dresser is inclined at an acute angle to the tangent plane, a concave surface will be dressed on the wheel and when the dresser support is so positioned that the axis of swing of the side dressing tool is inclined at an obtuse angle to the tangent plane, a convex surface will be dressed on the wheel.

The adjustment of the side dresser axially of the wheel in addition to permitting compensation for change in height of the wheel with dressing, enables the position of the center of swing of the wheel to be changed relative to the height of a side surface being dressed, allowing of movement of the diamond in a path inclined to a generatrix of the side surface of the wheel. By combining the axial adjustment with the offset adjustment of the diamond, profiles of varying curvature can be dressed on a wheel and a complete control of profile shape is possible.

The side dressers are actuated hydraulically. The arms that carry the side dressers are mounted on a pair of shafts to each of which there is secured a spur pinion. The two pinions mesh with racks cut into opposite sides of a piston that is disposed between the two shafts and that is reciprocable longitudinally by fluid pressure to effect oscillation of the shafts and of the side dressing tools carried thereby.

The angle between the axes of the two shafts is fixed, thus determining the included angle between the sides of the grinding wheel which is to be dressed. An adjustment is provided, however, in addition to the adjustments already described, so that the support for the side dressers may be adjusted angularly to vary the inclination of the planes of movement of the diamonds with reference to the axis of the grinding wheel, thereby to control the pressure angles dressed on opposite sides of the wheel.

The movement of the piston which produces the oscillation of the side dressers, is controlled by a manually operable control valve that is reciprocable to determine the direction of movement of the side dressers and is rotatably adjustable to control the rate of movement of the side dressers. Two separately adjustable throttle valves are provided which control the rate of exhaust from the piston that actuates the side dressers. When the main control valve is in one position of its rotary adjustment, one of these throttle valves controls the rate of movement of the side dressing tools and when the main control valve is in another position of its rotary adjustment, the other throttle valve controls the rate of movement of the dressing tools. The two throttle valves may be adjusted so that one allows a fast movement of the side dressing tools such as is used for dressing a wheel before rough grinding and the other may be adjusted so that when it is operative, the dressing tools will move at a relatively slow rate across the grinding wheel as required when dressing a wheel before a finish grinding operation.

To take up back-lash between the racks and pinions, each of the shafts that carries a side dresser is connected by means of a spur pinion with a rack cut into an auxiliary piston. The two auxiliary pistons are so connected hydraulically that the exhaust side of one piston is always connected with the exhaust side of the other piston and the exhaust fluid flowing from one piston tends to move the other piston in a direction opposite to that in which the piston is being moved by rotation of the shaft with which that piston is connected. Thus a hydraulic load is put on each shaft to hold the pinion, which drives the same, against one side of the teeth of the corresponding rack of the main actuating piston. Thus backlash between these main racks and the mating pinions is eliminated. This insures that each side-dressing tool will be moved at a uniform rate across the side surface of the wheel and dress a smooth surface thereon.

The end dressing tool is mounted upon a support which is adjustable so that the axis of swing of this tool may be inclined to a plane containing the axis of the grinding wheel. When so positioned, the end dressing tool, as it swings across the tip of the grinding wheel, will move in a circular path inclined to the plane of the wheel and dress an elliptical surface on the wheel in the plane of the axis of the wheel. It has been found that such a surface provides a sufficiently flat tip surface on the wheel to grind flat bottoms in the tooth spaces of the gear and at the same time forms rounds on the wheel where the tip joins the side surfaces of the wheel so that the wheel will grind sides on the tooth spaces which blend into bottoms of the spaces. With the elliptical top surface, sharp corners at the junctures of the top and the sides of the wheel are avoided, thereby eliminating the possibility of formation of sharp corners in the tooth spaces of a gear ground with the wheel. Moreover, the rounds formed by the elliptical end surface of the wheel will produce fillet radii in the tooth bottoms that will give the gear teeth maximum strength.

At times it may be desirable to dress the tip of the wheel to an absolutely flat surface instead of an elliptical surface and to provide rounds only at the juncture of this flat tip with the sides of the wheel. Adjustable stops are provided on the end dresser to so limit its movement and operation.

The end dresser shown is intended to be manually operated. It is mounted in a support which is adjustable laterally to determine the position of the center of arc of swing of the end dresser, radially of the wheel axis to accommodate wheels of different diameters, and angularly to control the angle between the axis of swing of the end dressing tool and the plane of the wheel axis thereby to control the radius of the elliptical surface dressed on the wheel. In addition, the end dresser support has some angular adjustment about the axis of the wheel so it may be positioned at a convenient point not to interfere with the gear being ground.

Both the side and end dressers are carried on a plate which is also adjustable about the axis of the grinding wheel so that the whole dressing mechanism can be adjusted to operate at a point that will not interfere with the grinding operation. This adjustment is in addition to the angular adjustment of the end dresser support above referred to.

Reference will now be had to the drawings for a more detailed description of the invention.

Figure 2:
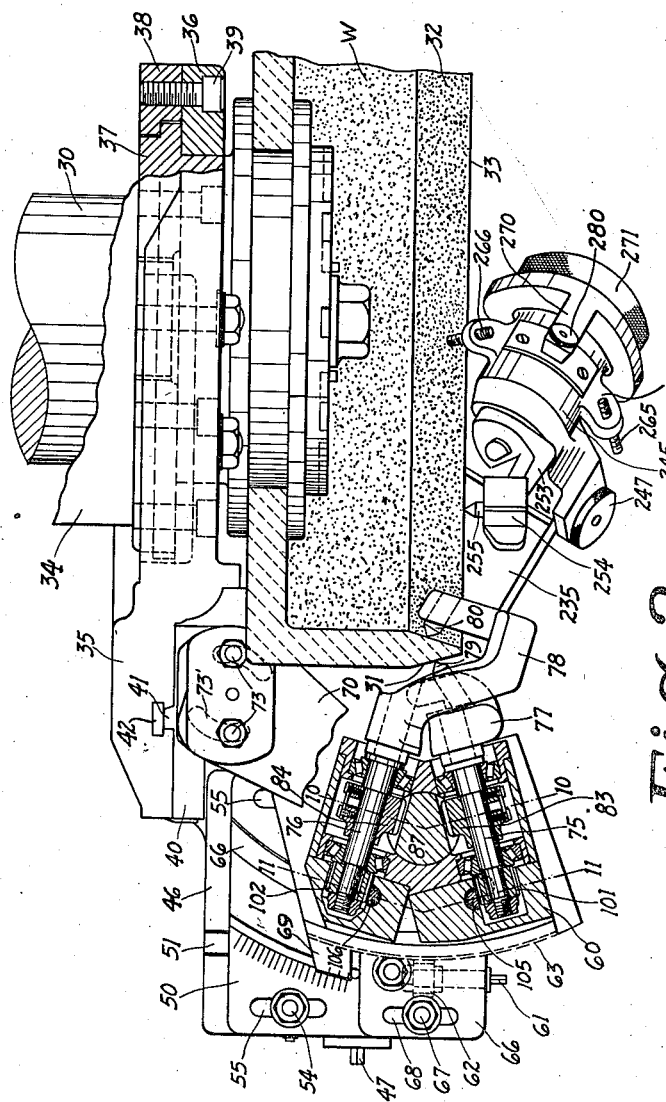
Fig. 2 is a part plan, part transverse sectional view of the parts shown in Fig. 1.

In Figs. 1 and 2, 30 denotes the wheel spindle of a grinding machine of known construction, 34 a sleeve in which the spindle is journaled and W a grinding wheel which is mounted on the spindle and secured thereto in any suitable manner.

The grinding wheel W here shown is a rotary annular wheel having active side surfaces 31 and 32 which are inclined to the axis of the wheel and which in the operation of the grinding machine represent tooth surfaces of a basic gear to which the gear being ground on the machine is to be generated conjugate. The tip surface of the wheel is denoted at 33.

There is a bracket 35 mounted on the sleeve 34 behind the grinding wheel. This bracket has a ring-like portion 36 formed integral with it which is adapted to be slipped over the wheel spindle and to be secured against a shoulder or head 37 formed on the sleeve 34. The bracket is secured on the sleeve by a clamping ring or gib 38 and screws 39 which secure the gib to the ring portion 36.

The bracket 35 is formed at one side of the wheel spindle with a plane surface 43 on which is adjustably mounted a slide 40. The slide is guided in its adjustment by a tongue 41 which is integral with the slide and is adapted to engage in a T-groove 42 formed in the bracket 35. The slide is adapted to be secured in any adjusted position on the bracket 35 by T-bolts 44 which also engage in the groove 42.

The slide 40 has a ledge or arm 45 formed integral therewith and projecting from one side of the slide. A plate 46 is mounted on the upper face of the ledge 45 for rectilinear adjustment thereon. This adjustment is effected by rotation of the screw-shaft 47 which is journaled in the ledge 45 and threads into a nut (not shown) which is formed integral with or secured to the plate 46. Graduations are provided on the ledge 45 and a suitable scale is secured to the plate 46 to permit of the adjustment of the plate on the ledge being made accurately.

A plate 50 is mounted on the plate 46 for rectilinear adjustment thereon in a direction at right angles to the direction of adjustment of the plate 46. The plate 50 is guided in its adjustment by a tongue 51 which is integral with the plate 49 and which engages in a groove 52 formed in the under face of the plate 50. Adjustment of a plate 50 on the plate 46 is effected by rotation of a screw shaft 53 which is carried by the plate 50 and which threads into a nut (not shown) that is secured to the plate 46. The plate 50 is secured in any position of its adjustment on the plate 46 by T-bolts 54 which pass through elongated slots 55 in the plate 50 and engage in T-slots formed in the ledge 45.

Mounted on the plate 50 for angular adjustment thereon is a housing 60. The angular adjustment of this housing is effected by rotation of a worm shaft 61 which is journaled in the plate 59 and which carries a worm 62 that meshes with a wormwheel segment 63 that is formed on the periphery of the housing 60. The housing is guided in its angular adjustment on the plate 50 by a tongue 65 which is formed on the underface of the housing and which engages in a circular arcuate groove 66 formed in the upper face of the plate 50. A gib 66 which is secured to the plate 50 by a bolt 67 serves to hold the housing on the plate 50. The bolt 67 passes through an elongated slot 68 in the gib and threads into the plate 50. The gib engages over an arcuate flange of the housing 60 on which the wormwheel segment 63 is formed. Suitable graduations are provided on the plate 50 and a pointer 69 is formed on the housing 60 to permit the adjustment of the housing on the plate 50 to be made accurately.

To hold the housing securely in any adjusted position, an overhead tie or brace 70 is provided. This overhead tie is secured at one end to the housing 60 by bolt 71. At its opposite end it is secured by a washer 72 and bolts 73 to a lug or ear 74 which is formed integral with the slide 40. The bolts 73 pass through arcuate slots 73' formed in the tie 70 and thread into the lug or ear 74.

Journaled on suitable anti-friction bearings in the housing 60 are a pair of shafts 75 and 76. These shafts are mounted in the housing so that their axes are inclined to one another at an angle corresponding, for instance, to the included angle between the inside and outside surfaces 31 and 32 of the grinding wheel which is to be dressed. The shaft 75 carries an arm 77 in which is mounted the diamond 79 for dressing the outside surface 31 of the grinding wheel. The shaft 76 carries an arm 78 in which is mounted the diamond 80 for dressing the inside surface 32 of the grinding wheel. The arm 78 is so shaped that at a mean point of swing of the arm, the diamond 80 will engage the inside surface 32 of the wheel and preferably at a point lying in the same radial plane of the wheel as the point of engagement of the diamond 79 with the outside surface of the wheel when the arm 77 is at a mean point of its swing. The arms 77 and 78 are so shaped or bent and the diamonds 79 and 80, respectively, are so mounted therein that the diamonds will lie at substantially right angles to the side surfaces which each is to dress.

There is a spur gear segment 83 fastened to the shaft 75 and there is a spur gear segment 84 fastened to the shaft 76. These segments mesh with racks 85 and 86, respectively, that are cut into opposite sides of a piston 87 (Figs. 2, 10 and 13).

The piston 87 is adapted to reciprocate in a bore or cylinder 82 formed in the housing 60. One end wall of this bore is closed by a cap or plate 88 and the other end wall is closed by a cap or plate 89. The piston is adapted to be reciprocated by fluid pressure. The pressure fluid is admitted to one end of the piston through a pipe 90 and a duct 91. It is admitted to the opposite end of the piston through a pipe 92 and a duct 93.

From the structure described, it will be seen that when the piston 87 is moved in one direction or the other in the housing 60, the arms 77 and 78 will be swung simultaneously in opposite directions to pass the dressing tools 79 and 80 simultaneously across the outside and inside surfaces 31 and 32 of the grinding wheel, respectively.

Keyed to the shaft 75 is a spur pinion 101 and keyed to the shaft 76 is a spur pinion 102 (Figs. 2, 11, 12 and 13). The spur pinion 101 meshes with a rack 103 that is formed in one side of a piston 105. The spur pinion 102 meshes with a rack 104 that is formed in one side of a piston 106. The pistons 105 and 106 are mounted to reciprocate in suitable bores or cylinders 107 and 108, respectively, formed in the housing 60 or in blocks that are secured thereto.

One end of the cylinder 107 is connected by means of a duct 110 with one end of the cylinder 108. The opposite ends of the two cylinders are connected by means of a duct 111. The duct 111 communicates with a duct 112. A ball check valve 113 controls the connection of the duct 112 with a duct 114 that is connected to the duct 91. The duct 111 also communicates with a duct 115. A ball check valve 116 controls the connection of this duct 115 with a duct 117 that leads into a duct 118. The duct 118 communicates with one side of the opening or chamber 120 that is formed in the housing 60 and in which the pinion 101 rotates.

The duct 110 is connected with the duct 93 in a manner similar to the connection of the duct 111 with the duct 91. As illustrated diagrammatically in Fig. 13, the duct 110 communicates with the duct 122, which, in turn, is connected with a duct 124, the latter connection being controlled by the ball check valve 123. The duct 124 communicates with the duct 93. The duct 110 is also connected with the duct 118 in a manner similar to the connection of the duct 111 with the duct 118. The duct 110 communicates with a duct 125 which is connected with a duct 127, a ball check valve 126 governing the connection. The duct 127 communicates with the duct 118 that communicates with the chamber 120 in which the pinion 101 rotates.

Assuming that the line 91 leading to the upper end of the cylinder 82 is on supply and the duct 93 leading to the lower end of the cylinder is on exhaust, then the piston 87 will be moved to the left in the cylinder 82 as shown in Figs. 10 and 13. This will cause the shafts 75 and 76 to be rotated in counterclockwise and clockwise directions, respectively, as indicated by the arrows in Fig. 13 to swing the dressing tools 79 and 80 across the sides of the grinding wheel. The pressure fluid flowing from the line 91 through the duct 114 will seat the ball check valve 113 and, therefore, will not enter the duct 112. As the shafts 75 and 76 rotate, the pistons 105 and 106 will be moved from right to left in their cylinders 107 and 108, respectively, as denoted by the arrows in Fig. 13, through operation in the one instance of the pinion 101 and rack 103 and in the other instance of the pinion 102 and rack 104.

The cylinders 107 and 108 are connected by a substantially closed hydraulic circuit. Thus, as the piston 106 moves, from right to left in its cylinder 108 the motive fluid will be forced out of the left-hand end of the cylinder 108 into the duct 111. This fluid cannot flow through the duct 112 into the line 114 because at this time the check valve 113 is closed by pressure fluid flowing from the line 91. This fluid cannot flow through the line 115 into the line 117 either, because the pressure on the ball check valve 116 will seat that valve and close the connection between the lines 115 and 117. Consequently the only place to which the fluid from the cylinder 108 can flow is into the cylinder 107. But at this time, the piston 105 is as already stated moving to the left in the cylinder 107 and is forcing fluid out of the left hand end of the cylinder 107 and the fluid flowing out of the left hand end of the cylinder 107 is trying to flow through the duct 111 into the left hand end of the cylinder 108. It cannot flow through the ducts 112 and 115 into the ducts 114 and 117 because both latter ducts are closed by the valves 113 and 116, respectively. Consequently a resistance or load is put on both the piston 105 and the piston 106, causing a resistance or load to be placed upon the shafts 75 and 76 to take up any backlash between the gear 83 and rack 85 on the one hand and the gear 84 and rack 86 on the other. The result will be that the movement of the piston 87 will be transmitted without backlash to the diamonds 79 and 80 and the diamonds will be moved with a smooth, even motion to dress a smooth, even surface on the grinding wheel.

The amount of load on the shafts 75 and 76 is determined by the pressure in the line 114. When the load exceeds the pressure in the line 114, the valve 113 will be forced open.

During the movement of the piston 105 in either direction in the cylinder 107, the hydraulic motive fluid will leak past the piston into the chamber 120 that encloses the gear 101. This leakage serves to replenish the substantially closed hydraulic system connecting the cylinders 107 and 108. As the piston 105 moves, as described, from right to left in its cylinder 107, the ball-check valve 123 will be seated and the ball-check valve 126 will be opened by the suction created by this movement of the piston 105. This will cause the motive fluid contained in the chamber 120 to be sucked from the chamber through the lines 118, 127 and 125 into the right hand end of the cylinder 107 and further through the line 110 into the right hand end of the cylinder 108. Thus the right hand ends of the cylinders 107 and 108 are filled with the motive fluid ready for the subsequent reverse movement of the pistons 105 and 106.

When the direction of flow of the motive fluid to the cylinder 89 is reversed and the ducts 93 and 91 are put on supply and on exhaust, respectively, then the ball check valve 123 will be closed by fluid pressure. The piston 87 will then be moved to the right from the position shown in Figs. 10 and 13 and the shafts 75 and 76 will be rotated in clockwise and in counterclockwise directions, respectively. This will cause the pistons 105 and 106 to be moved to the right in their cylinders 107 and 108.

The movement of the piston 106 to the right in its cylinder will tend to force the oil contained in the right end of the cylinder into the line 110 and thence into the right end of the cylinder 107 and vice versa the oil tending to flow from the right hand end of the cylinder 107 will tend to flow through the line 110 into the right-hand end of the cylinder 108. The oil cannot escape through the valve 123 because this is closed by pressure and it cannot escape to the duct 127 because it will tend to seat the valve 126. Thus a resistance or load will again be placed on both pistons 105 and 106 tending to prevent movement of these pistons to the right under actuation of the pinions 101 and 102, respectively. This load will be transmitted back through the rack 103, pinion 101, shaft 75, and segment 83 and through the rack 104, pinion 102, shaft 76 and segment 84, respectively, to the racks 85 and 86, respectively. Thus, the backlash will be taken up between the racks 85 and 86, respectively, and the segments 83 and 84, respectively, which mesh therewith. Thus the diamonds carried by the swinging arms 77 and 78 will again move smoothly and at a uniform rate across the side surfaces of the grinding wheel.

The amount of load is determined by the pressure in the line 124, for the valve 123 will not be opened until the pressure in line 122 exceeds that in line 124. As the piston 105 moves to the right, the valve 113 is held closed and the valve 116 is opened by suction. Thus the motive fluid is drawn into the left hand ends of the cylinders 107 and 108 from the chamber 120 through the ducts 118, 117, 115 and 110.

The direction and rate of movement of the piston 87 is controlled by a valve 130 (Figs. 21 to 29 inclusive) which may be mounted at any convenient point on the grinding machine. This valve is slidably and rotatably mounted in a sleeve 131 that is secured in the valve casing 129.

The valve 130 is formed with spaced collars 132, 133, 134 and 135. The collar 135 is provided with two peripheral recesses 136 and 137 (Fig. 29) which extend for the full height of the collar and which are spaced 90° apart. The portion of the collar between the two recesses is cut away for half of its height so that the two recesses are connected by an arcuate slot 138. A pin 139 which is secured in the valve casing serves as a stop to limit the rotational adjustment of the valve in either direction. A coil spring 140, which is interposed between the valve and the bottom wall 141 of the valve casing, tends to hold the valve in the upper position shown in Fig. 22.

The collars 133 and 134 of the valve are cylindrical. The collar 132 is of considerable length and is cylindrical at its ends but has plane parallel surfaces 145 and 146 formed on opposite sides between its ends. A hole or duct 147 is drilled into the valve connecting the two plane parallel surfaces 145 and 146.

Figure 24:
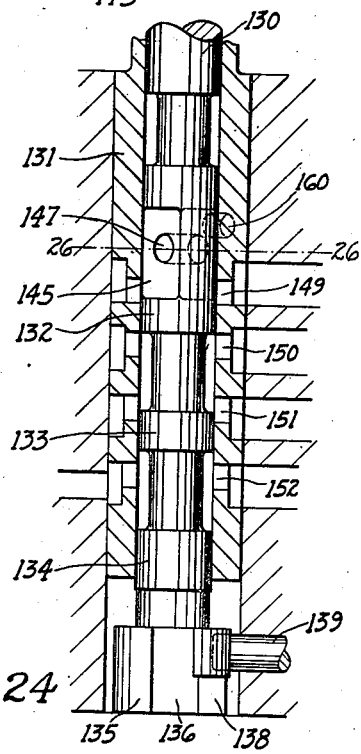
Fig. 24 is a fragmentary sectional view, showing the valve stem turned at a slight angle from the position illustrated in Fig. 21 and moved downwardly to one position of its use.
Figure 25:
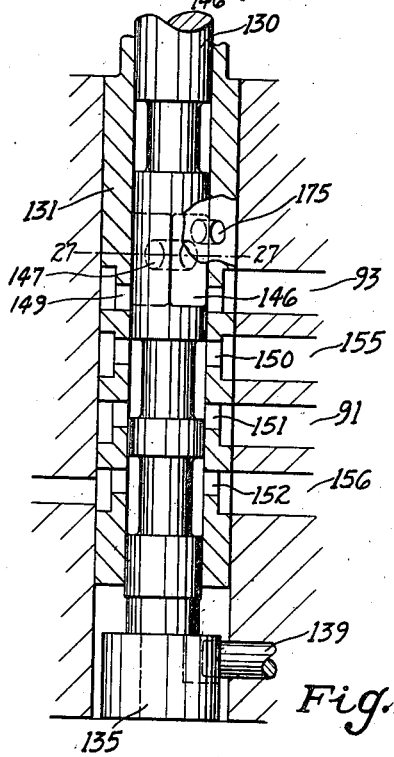
Fig. 25 is a sectional view taken at right angles to the section of Fig. 24 and showing the valve in another position of its use.

The sleeve 131 is provided with four series of ports. The ports of each series are radially arranged and the ports of the different series are denoted at 149, 150, 151 and 152, respectively, (Figs. 22, 24 and 25). The ports 149 communicate with the duct 93 that leads, as already described, to one end of the cylinder 89. The ports 150 communicate with the duct 155 through which pressure fluid is supplied to the valve casing. The ports 151 communicate with the duct 91 that leads, as already described, to one end of the cylinder 89. The ports 152 communicate with an exhaust duct 156 that leads to the sump of the machine.

Figure 26:
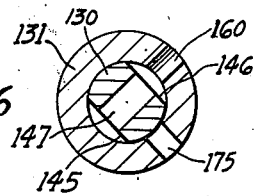
Fig. 26 is a section through the valve stem and valve sleeve taken on the line 26—26 of Fig. 24.
Figure 27:
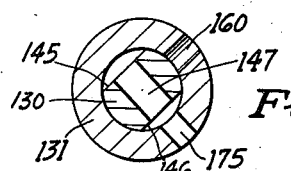
Fig. 27 is a section through the valve stem and sleeve taken on the line 27—27 of Fig. 25.
Figure 28:
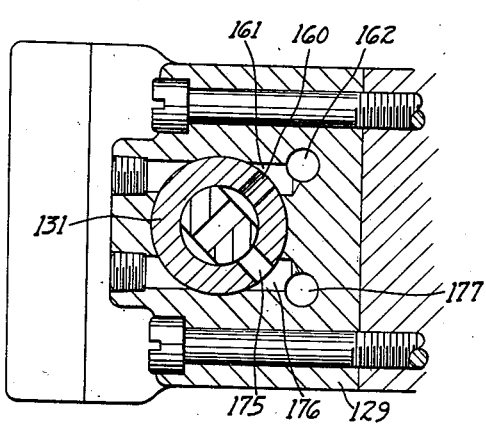
Fig. 28 is a sectional view through the whole valve block taken in the same plane as Fig. 26.
Figure 29:
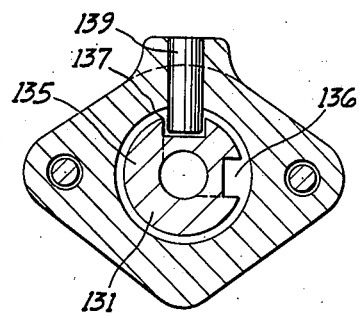
Fig. 29 is a sectional view approximately on the line 29—29 of Fig. 22 looking in the direction of the arrows.

The sleeve 131 is formed, in addition, with two radial ports 160 and 175 that lie in the same plane and are arranged at right angles to one another as shown in Figs. 26 and 27. The port 160 communicates with a duct 161 drilled horizontally in the valve block 129 (Fig. 28). This duct communicates with a vertical duct 162 (Figs. 28 and 21). The duct 162 communicates with a horizontal duct 163 (Fig. 23) which is connected with a horizontal duct 164. A needle valve 165, which is adjustably threaded into the block 129 and which enters into the duct 164, is provided to control the rate of flow of the exhaust fluid from the duct 164 to a short vertical duct 166 (Fig. 21). The duct 166 communicates with a horizontal cross duct 167. This duct communicates with a vertical duct 168 (Figs. 21 and 22) which is connected by means of the ports 152 with the exhaust line 156 that leads to the sump of the machine.

The port 175 communicates with a horizontal duct 176 (Fig. 28) which, in turn, communicates with a vertical duct 177. The duct 177 leads into a horizontal duct 178 (Fig. 23) which communicates with a horizontal duct 179. A needle valve 180, which is adjustably threaded into the valve block 129 and which enters into the duct 179, is provided to control the rate of flow of the exhaust fluid from the duct 179 into a short vertical duct 182 (Fig. 21). The duct 182 communicates with the horizontal cross duct 167 already referred to. This latter duct, as already described, communicates with a vertical duct 168 (Figs. 21 and 22), which is connected by means of the ports 152 with the main exhaust line 156.

The valve is shown in Fig. 22 in inoperative position. When the valve is pressed down by the operator, the pin 139 moves in the slot 136 or the slot 137 whichever is in registry with the pin 139 and the valve may be moved to the position shown in either Fig. 24 or Fig. 25. Fig. 24 shows the position assumed when the pin 139 is in registry with the slot 137 and Fig. 25 shows the position assumed when the valve has been rotated to bring the pin 139 into registry with the slot 136.

When the valve has been moved into the position shown in Fig. 24, the motive fluid will flow from the line 155 through the ports 150 and 151 into the line 91 which leads to the cylinder 89, to move the piston 87 to the left in that cylinder as shown in Figs. 10 and 13. At the same time, the motive fluid exhausts from the other end of the cylinder 82 through the line 93, the ports 149, the hole 147 in the valve 130 (Figs. 24 and 26), the port 160 in sleeve 131, the ducts 161, 162, 163 and 164, the needle valve 165, the ducts 166, 167, 168, the ports 152 and the duct 156 back to the sump of the machine. When the valve 130 is moved to the position shown in Fig. 24, then, the rate of movement of the diamonds 79 and 80 across the side surfaces of the grinding wheel is determined by the setting of the needle valve 165.

The operator holds the knob 170 down until the diamonds 79 and 80 have moved fully across the opposite side surfaces of the grinding wheel to dress these surfaces. Then he releases the knob. The spring 140 then returns the valve 130 to the position shown in Fig. 22. Then the line 93 leading to the left hand end of the cylinder 82 is put on supply from the line 155 through the ports 150 and 149. At the same time, the line 91 leading to the other end of the cylinder 82 is put on exhaust through the ports 151 and 152 and the duct 156. This return movement of the piston 87 and of the diamonds is unthrottled and is at high speed since the diamonds have not been fed further into the wheel and therefore do not dress the wheel during this return movement.

By rotating the valve 130 through 90°, the valve may be adjusted so that the needle valve 180 will govern the rate of dressing movement of the diamonds. The valve stem is rotated until the pin 139 strikes the opposite end of the slot 138 and is in alignment with the slot 136. Then, if the operator depresses the valve, it will assume the position shown in Fig. 25. In this position, the pressure fluid flows from the supply line 155 through the ports 150 and 151 and the line 91 to the right hand end of the cylinder 82, forcing the piston 87 to the left. At the same time, the motive fluid exhausts from the left hand end of the cylinder 82 through the duct 93, the ports 146, the hole 147 in the valve stem, the port 175 (Figs. 25 and 27), the ducts 176 (Fig. 28), 177, 178, 179 (Figs. 21 and 23), the needle valve 180, the ducts 182, 167, and 168, the ports 152, and the duct 156 back to the sump of the machine.

As before, when the knob 170 is released, the spring 140 will operate to return the valve 130 to its upper position. Then the line 93 will be put on supply from the line 155 through the ports 150 and 149 and the line 91 will be put on exhaust through the ports 151 and 152 and the line 156. Again there is no throttling of the exhaust on the return movement of the piston 87 and the diamonds 79 and 80 simply return to initial position at high speed.

The needle valves 165 and 180 are intended to be adjusted to throttle the exhaust at different rates. One valve may be adjusted to allow a very slight flow of the exhaust fluid so that the diamonds will move at a relatively slow rate across the operating surfaces of the grinding wheel and dress the same to a very smooth finish as desired when the wheel is to be used for a subsequent finish-grinding operation. The other needle valve may be opened somewhat more so that it will allow of a faster movement of the diamonds as is desirable when dressing the wheel prior to a rough grinding operation. By rotatably adjusting the valve 130, then, either needle valve can be brought into operative position thereby to obtain the desired rate of movement of the diamonds in the dressing operation. A pointer 185 is fastened to one side of the valve casing 129 by means of a screw 186 and the collar 187, which is secured to the valve stem, may be suitably graduated to enable the operator readily to rotate the valve into one or other of its dressing positions, as desired.

As has already been stated, the dressing mechanism of the present invention may be employed to dress either an approximately straight or a curved profile on the side of the grinding wheel. To obtain a substantially straight grinding profile on the grinding wheel, the slide 40 (Figs. 1 and 2) is adjusted on the bracket 43, the plate 46 is adjusted on the slide 40, and the plate 50 is adjusted on the plate 46 so that each of the dressing diamonds will move in a circular arc extending in the general direction of the generatrix of the desired conical inside or outside grinding surface, respectively, of the wheel. In this position, the planes containing said circular arcs are tangent to the inside or outside grinding surfaces of the wheel respectively.

Figure 14:
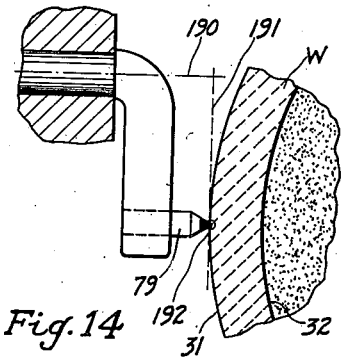
Fig. 14 is a diagrammatic view showing the grinding wheel in section at a mean point of contact between a side-dressing tool and the wheel and illustrating the relation of the dressing tool and the wheel in the dressing of an approximately straight profile on a side surface of the wheel.
Figure 15:
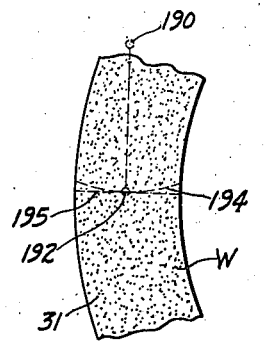
Figs. 15 and 16 are diagrammatic views showing, respectively, a fragment of an active side surface of the grinding wheel in elevation and a section through the wheel in a radial plane, and further illustrating the relation of the dressing tool and wheel when the tool is positioned as shown in Fig. 14.
Figure 16:
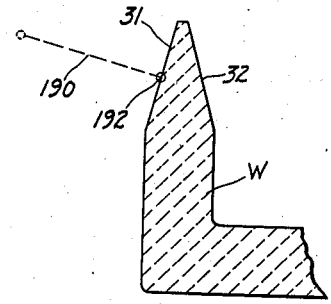

This position is illustrated diagrammatically in Figs. 14-16 inclusive. Here for the purposes of simplicity we have illustrated only the position of the outside dressing diamond 79. It is to be understood, however, that what is said of the outside dressing diamond applies equally to the positioning of the inside dressing diamond.

The diamond is shown in Figs. 14 to 16 positioned so that the axis 190 of swing of the dressing diamond is perpendicular to a plane 191 tangent to the conical outside surface 31 of the wheel at a mean point 192 in said surface. The point 192 is preferably a point corresponding to a point midway the height of the profile of the gear or pinion tooth surface which is to be ground with the grinding wheel. With this arrangement, the path of the diamond as it is swung about the axis 190 is a circular arc 194 which is tangent to a generatrix 195 of the grinding surface 31 at the mean point 192 and which, therefore, extends in the general direction of the generatrix 195. The plane of the circular arc 194 is identical with the plane 191 tangential to the conical grinding surface 31 at the mean point 192. It can readily be demonstrated that the grinding profile produced on the grinding wheel by a swinging dressing tool when the dressing tool is positioned in the manner illustrated in Figs. 14-16 inclusive departs from a straight line by amounts which are entirely negligible and that to all intents and purposes the grinding wheel has a straight profile.

Figure 17:
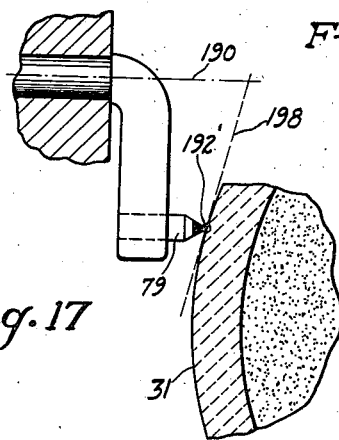
Fig. 17 is a diagrammatic view similar to Fig. 14 but showing the dressing diamond positioned to dress a concave side surface on a grinding wheel.

A concave grinding profile may be dressed upon the grinding wheel when the slide 40 (Fig. 1) is adjusted upwardly from the position shown in Fig. 14 and the plate 46 is adjusted inwardly from the position shown on the slide 40 to bring the diamond into a position such as illustrated in Fig. 17. Then the axis of swing 190 of a dressing tool is inclined at an acute angle to a plane 198 tangent to the active surface 31 of the wheel at a mean point of contact 192' of the diamond with the side of the wheel. The circle along which the diamond 79 extends then recedes from the plane 198 at the sides of the grinding wheel and hence a concave surface is dressed on the wheel.

Figure 18:
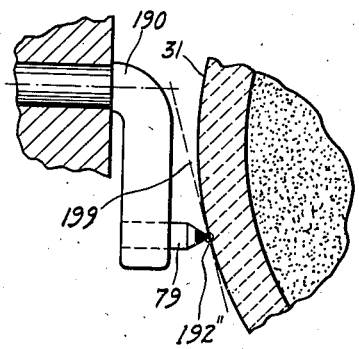
Fig. 18 is a diagrammatic view similar to Figs. 14 and 17, but showing the side dressing tool positioned to dress a convex surface on the side of a grinding wheel.

A surface of convex profile may be dressed on the side 31 of the grinding wheel by moving the slide 40 downwardly from the position denoted in Fig. 14 and then adjusting the plate 46 radially inwardly on the slide 40 to bring the diamond into a position such as denoted in Fig. 18. Here the axis 190 of swing of the diamond is inclined at an obtuse angle to the plane 199 which is tangent to the active surface 31 of the wheel at a mean point of contact 192" of the diamond and the wheel. The circle along which the diamond then swings reaches inside of the tangential plane 199 at opposite ends of the swing of the diamond and hence a convex surface is dressed on the wheel. By adjusting the slide 40 so that the axis 190 of swing of the diamond is radial of the axis of the grinding wheel a spherical surface may be dressed on the grinding wheel.

Figure 19:
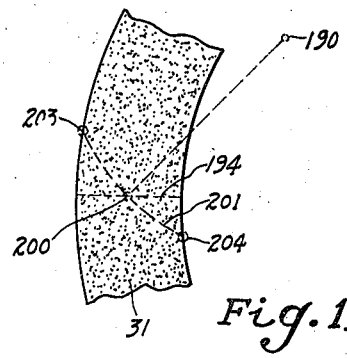
Figs. 19 and 20 are diagrammatic views showing, respectively, a fragmentary elevation of the active surface of the grinding wheel and a fragmentary section through the wheel at a mean point of contact between the dressing tool and the wheel and illustrating diagrammatically how a side dressing tool may be positioned to dress a profile of varying curvature on a side surface of a grinding wheel.
Figure 20:
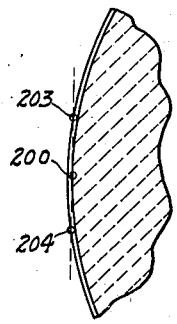

The grinding profiles produced upon the wheel when a diamond is set as illustrated in Figs. 17 and 18 are circular arcs or more precisely curves which do not differ measurably from circular arcs. Figs. 19 and 20 illustrate how grinding profiles of varying curvature may be produced.

Here the plate 50 has been so adjusted on the plate 46 that the arc 201 on which the diamond moves extends obliquely to a generatrix 194 of the grinding surface. The axis 190 of swing of the diamond is perpendicular to a plane tangent to the side surface of the grinding wheel at a mean point 200. Since the end points 203 and 204 of the circular arc 201 lie in the tangential plane but away from the line 194 of tangency of this plane with the side surface of the grinding wheel, additional stock will be left on the upper and lower portions of the grinding surface 31 so that a concave grinding surface will be produced on the wheel. The point 203 of the arc 201 is at a greater distance from the generatrix 194 than the point 204. Therefore, the grinding profile produced is not symmetrical with respect to a mean point 200. Hence, the concave profile dressed on the wheel will be of varying curvature throughout its height.

By adjusting a dressing tool so that its axis of swing is inclined at an acute angle or at an obtuse angle to the tangential plane, while maintaining the plate 50 positioned so that the arc of swing of the diamond is inclined to a generatrix 194, profiles of further modified curvature may be produced on the grinding wheel.

The various adjustments provided make it possible, therefore, to produce any desired profile curvature on the grinding wheel. This makes it possible to control the bearing or tooth surface contact on the teeth of a pinion ground with the wheel. For instance, if it is found that a spiral bevel pinion meshes with its mate gear with an "arrow-head" bearing, that is, with a bearing which narrows toward one end of the pinion tooth and which at the opposite end of the tooth is heavy toward both the tip and toward the root of the tooth but fades out or is lacking entirely near the pitch line of the tooth, the presence of such a bearing indicates the desirability of using a grinding wheel of curved grinding profile. Where the point of the "arrow-head" bearing is directed toward the small end of the gear tooth, it has been found that if the grinding wheel is dressed with a slightly concave profile, this bearing condition can be eliminated and a full length, full profile baring can be obtained. If the point of the "arrow-head" is directed towards the large end of the pinion tooth, it has been found that a full length, full profile bearing can be obtained by grinding the pinion with a grinding wheel of slightly convex profile. Various other uses of grinding wheels having curved profiles will suggest themselves to those skilled in the art, but with a curved profile grinding wheel, it is possible to eliminate a "diamond" bearing, a "half-moon" bearing, etc.

In addition to the functions already noted, the adjustment of the plate 46 on the slide 40 permits of adjusting the side-dressers to dress wheels of different diameters; the adjustment of the plate 50 on the plate 46 permits of adjusting the side-dressers to dress wheels having active side surfaces of different heights. The angular adjustment of the housing 60 allows of varying the inclination of the planes of swing of the diamonds to the axis of the wheel to suit the outside and inside pressure angles to be dressed on the wheel.

Mounted on the bracket 35 for angular adjustment thereon about the axis X of the grinding wheel spindle is a plate 210 (Fig. 1). This plate is secured to the bracket 35 by bolts (not shown) which engage in the arcuate T-slot 211 which is formed on the front face of the bracket 35.

Mounted on the plate 210 for rectilinear adjustment thereon is a slide 212. This slide is secured in any position of its adjustment on the plate 210 by a T-bolt 213 whose head engages in an elongated T-slot 214 formed in the plate 210 (Figs. 1 and 6). A pointer 215 and a scale 216 are provided to enable this adjustment to be made accurately.

Mounted in the slide 212 for rotatable and axial adjustment therein is a cylindrical bar 220 (Figs. 1, 6 and 7). Keyed to this bar by means of a key 221 (Fig. 7) is a nipple 222. A cap member 223 is threaded on the outside of this nipple and fixedly secured thereto by a set-screw 224. A screw shaft 225 is rotatably mounted in a hole in the cap member 223 and is held against axial movement relative to the cap member by the washer 226 and the thimble 227 which abut, respectively, against opposite sides of the cap member 223 and which are pinned to the screw shaft 225. The screw shaft threads into a nut 228 that is threaded into a bore 229 of the bar 220. A pin 230 which is secured in the thimble 227 serves to rotate the screw-shaft. When the shaft is rotated, the bar 220 is moved axially in the slide 212.

Figure 3:
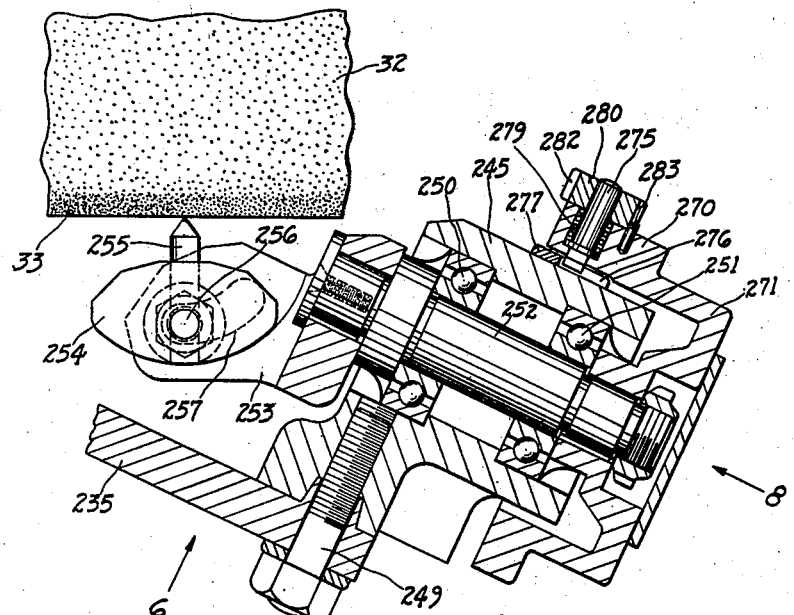
Fig. 3 is a transverse sectional view through the end dresser and showing the position of this dresser in dressing the tip of the wheel.

The bar 220 carries at its forward end a plate 235 (Figs. 3, 6 and 7). This plate has an opening to receive the bar and has a pressed fit on the bar. The bar is not only slidably adjustable in the slide 212 but is also rotatably adjustable thereon. For the purpose of making this adjustment accurately a collar 240 is secured to the plate 235 by screws 241 (Figs. 1 and 7). This collar is provided with graduations which read against a pointer 242 that is secured to the slide 212. The rotatable adjustment may be made manually. After the adjustment has been made the bar is clamped in any adjusted position by the clamping blocks 237 and 238 (Fig. 6) which are rounded to engage the periphery of the bar and which are manipulated by the screw 239.

Mounted on the plate 235 for rectilinear adjustment thereon is a housing 245 (Figs. 1, 2, 3 and 6). The adjustment of this housing on the plate may be made by means of a screw shaft 246 which is journaled in the plate and which threads into a nut (not shown) that is secured to the plate 235. The screw shaft may be rotated by means of a knurled knob 247. The housing 245 is secured in any adjusted position on the plate 235 by a screw 249 (Fig. 3) which passes through an elongated slot 250 (Fig. 6) that is provided in the plate 235 and which threads into the housing 245.

Journaled in the housing 245 on spaced anti-friction bearings 250 and 251 (Fig. 3) is a shaft 252 to one end of which is secured an arm 253. A diamond holder 254, that carries the diamond 255 is mounted on this arm for angular adjustment thereon. This angular adjustment permits of adjusting the diamond so that it extends at right angles or any other desired angle to the tip surface 33 to be dressed. The diamond holder may be secured in any adjusted position by a bolt 256 which passes through an arcuate slot 257 in the arm 253 and which threads into the diamond holder.

The angular adjustment of the plate 210 on the bracket 35 (Fig. 1) and the angular adjustment of the plate 235 and bar 220 on the slide 212 (Fig. 6) permit of positioning the housing 245 (Fig. 3) so that the axis of the shaft 252 is inclined at any desired angle to the tip surface 33 of the grinding wheel. The rectilinear adjustment of the slide 212 on the plate 210 permits of adjusting the end dressing diamond 255 in accordance with the height of the wheel to be dressed. The rectilinear adjustment of the bar 220 in the slide 212 permits of this setting being made more precisely, as to compensate for wear of the wheel. The rectilinear adjustment of the housing 245 on the plate 235 permits of positioning the diamond so that the center of swing of the diamond will be midway the sides of the wheel.

Figure 4:
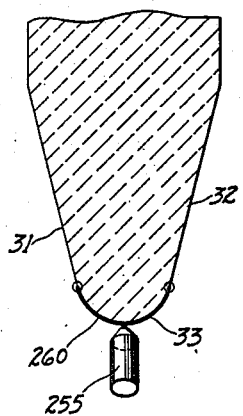
Fig. 4 is a diagrammatic view showing the relation of the diamond to the wheel in the dressing of the tip surface of the wheel, the view being a cross-section taken in the plane of oscillation of the dressing tool.
Figure 5:
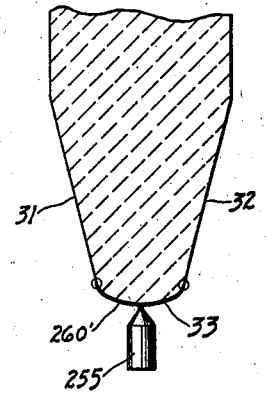
Fig. 5 is a corresponding diagrammatic sectional view taken in the plane of the axis of the grinding wheel.

When the diamond 255 is positioned so that the axis of the shaft 252 is inclined, as shown in Figs. 2 and 3, at other than a right angle to a plane containing the axis of the grinding wheel, it will dress an elliptical curve on the tip of the wheel. In a plane of the diamond rotation the diamond will, of course, trace a circular arc 260 (Fig. 4) on the tip surface of the grinding wheel but in the axial plane of the grinding wheel, as illustrated in Fig. 5, the path of movement of the diamond will be an ellipse as denoted in heavy lines at 260'. The elliptical curve provides a substantially flat surface on the top of the grinding wheel while providing rounds at the sides of the wheel which blend into the side surfaces 31 and 32 of the wheel without any sharp corners. Thus the dressing mechanism of the present invention permits of dressing the grinding wheel so that suitable fillet curves are produced at the root lines of opposite sides of each tooth space of a gear or pinion ground with the wheel while the bottoms of the tooth spaces are ground substantially flat. At the same time no sharp corners will be formed at the junctures of the bottoms with the sides of the teeth. Hence sources of possible cracks in the gear teeth will be eliminated.

A knurled knob 271 is keyed to the shaft 252 to permit manual rotation of the shaft to effect the dressing of the tip of the grinding wheel as described.

Adjustable stops 265 and 266 that thread into lugs or ears 267 and 268, respectively, formed on opposite sides of the housing 245 serve to limit the swinging movement of the end dresser. These stops are adapted to be engaged, respectively, with opposite sides of a lug 270 (Figs. 2, 3, 8 and 9) that is formed on the knurled knob 271.

Mounted in the lug 270 is a spring pressed detent 275 which is engageable in a recess 276 formed in a collar 277 that is fastened in any suitable manner to the housing 245. A coil spring 279 serves to hold the detent 275 in engagement with the notch or recess 276. A knurled knob 280 is secured to the detent to enable the operator to retract the detent from engagement with the notch 276 and to allow him to rotate the detent when retracted. The knob 280 has four equiangularly spaced notches 282 formed on its periphery. A pin 283, which is secured in the lug 270, is adapted to be engaged selectively in one of these notches to hold the knob 280 and detent 275 in any one of the four different positions in which the detent may be engaged with the recess 276. In addition, the knob 280 may be pulled out and rotated to a position where its bottom face will ride on the tip of the pin 283 so as to hold the detent out of engagement with the recess 276.

When the detent 275 is retracted far enough so that the knob rides on the top of the pin 283, the shaft 252 may be swung through the full angle determined by the settings of the stops 265 and 266. When the pin 283 is engaged in one of the notches 282 of the knob 280 so that the detent is in the position shown in Fig. 8 then the shaft 252 can be rotated in a counterclockwise direction until the stop 265 strikes the lug 270, but it cannot be rotated in a clockwise direction from the position shown because the detent prevents such movement. On the counterclockwise movement the detent simply rides up out of the notch 276. By disengaging the detent from the notch 276 and rotating the knob 280 through an angle of 180° from the position shown in Fig. 8, the detent can be positioned to prevent counterclockwise movement of the shaft from the position shown while permitting clockwise movement through the distance limited by the stop 266. When the detent is adjusted to a position at right angles to that shown in Fig. 8, it locks the shaft 252 against rotation in either direction.

When the detent is held out of engagement with the notch 276, full swing of the diamonds across the end of the wheel to dress the tip of the wheel and rounds at the junctures of the sides of the wheel with the tip is allowed. When the detent is in the position shown in Fig. 8 or in a position at 180° to that shown in Fig. 8, only a limited swing of the diamond is possible and such swing may be employed simply to dress a round at the juncture of the tip 33 of the wheel with one or other side 31 or 32 of the wheel. When the detent is in a position at 90° from the position shown in Fig. 8, then no swing of the diamond is possible but the diamond may be moved by the knob 247 to dress a straight tip surface on the wheel. This may be desirable for dressing wheels for automotive work. It will be seen, therefore, that the present invention provides a dressing mechanism capable of a wide range of work.

While the invention has been described in connection with a dressing mechanism for dressing an annular wheel, it will be understood that in principle the dressing mechanism of this invention may be employed in dressing other types of wheels also. It will further be understood that while the invention has been described in connection with a particular embodiment thereof, it is capable of various further modifications. The present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the limits of the appended claims.

Having thus described our invention, what we claim is:

1. Mechanism for dressing a side surface of a rotary wheel for grinding gears comprising a dressing tool, a support on which the dressing tool is oscillatably mounted, means for adjusting said support so that the axis of oscillation of the tool is inclined at other than right angles to a plane tangent to the side surface of the wheel at a mean point of contact of the dressing tool with said side surface of the wheel, and means for swinging the dressing tool about its axis in a circular arcuate path lying wholly in a plane perpendicular to said axis.

2. Mechanism for dressing a side surface of a rotary wheel for grinding gears comprising a support, a dressing tool oscillatably mounted on said support, means for adjusting said support in a direction at right angles to a plane containing the axis of said wheel to vary the offset of the axis of swing of said dressing tool with reference to the axis of said wheel, means for adjusting said support in a direction at right angles to the first named adjustment to vary the position of the dressing tool radially of the axis of the grinding wheel, and means for swinging the dressing tool on its axis in a circular arcuate path which lies wholly in a plane perpendicular to said axis.

3. Mechanism for dressing opposite side surfaces of a rotary grinding wheel comprising a support, a pair of shafts journaled in said support at the same side of one of the side surfaces of the wheel with their axes inclined to one another at an angle equal to the included angle between the opposite side surfaces of the wheel, an arm secured to each of said shafts, a dressing tool secured to each of said arms, one of said arms being formed to position the dressing tool secured thereto so that the tool will engage one side of the wheel and the other of said arms being formed to position the other dressing tool for engagement with the opposite side of the wheel, and means for simultaneously oscillating said arms to effect the dressing movements.

4. Mechanism for dressing opposite sides of a rotary grinding wheel comprising a support, a pair of shafts journaled in said support at the same side of one of the sides of the wheel with their axes inclined to one another at an angle equal to the included angle between the opposite side surfaces of the wheel, an arm secured to each of said shafts, a dressing tool secured to each of said arms, one of said arms being formed to position the dressing tool secured thereto so that the tool will engage one side of the wheel and the other of said arms being formed to position the other dressing tool for engagement with the opposite side of the wheel, a reciprocable piston mounted in said support between said shafts, means operatively connecting said piston to said shafts to oscillate both of said shafts on reciprocation of said piston, and means for applying fluid pressure selectively to opposite ends of the piston to move the piston selectively in opposite directions.

5. Mechanism for dressing opposite sides of a rotary grinding wheel comprising a support, a pair of shafts journaled in said support at the same side of one of the sides of the wheel with their axes inclined to one another at an angle equal to the included angle between the opposite side surfaces of the wheel, an arm secured to each of said shafts, a dressing tool secured to each of said arms, one of said arms being formed to position the dressing tool secured thereto so that the tool will engage one side of the wheel and the other of said arms being formed to position the other dressing tool for engagement with the opposite side of the wheel, a piston mounted in said support between said shafts, a spur gear secured to each shaft, a pair of racks secured to opposite sides of the piston, one of which is adapted to mesh, respectively, with each of said spur gears, means for applying fluid pressure selectively to opposite ends of the piston to move the piston selectively in opposite directions, and means for applying a load to said shafts to take up backlash between said racks and gears.

6. Mechanism for dressing a rotary wheel for grinding gears comprising a support, a shaft journaled in said support, an arm secured to said shaft, a dressing tool secured to said arm, gearing for oscillating said shaft, and means operatively connected to the shaft and actuated by the shaft on its rotation for applying a load to said shaft to take up backlash in said gearing.

7. Mechanism for dressing a rotary wheel for grinding gears comprising a support, a shaft journaled in said support, means for oscillating said shaft comprising a piston reciprocable in said support, a rack secured to said piston, a gear meshing with the rack and secured to said shaft, means for applying fluid pressure selectively to opposite ends of the piston to reciprocate the piston, and fluid pressure operated means operatively connected to said shaft and actuatable on rotation of the shaft for applying a load to the shaft to take up backlash between the rack and the gear.

8. Mechanism for dressing a rotary wheel for grinding gears comprising a support, a shaft journaled in said support, means for oscillating said shaft comprising a piston reciprocable in said support, a rack secured to the piston, a gear meshing with the rack and secured to the shaft, and means for applying fluid pressure selectively to opposite ends of the piston to reciprocate the piston, and means for taking up backlash between the rack and gear comprising a second gear secured to the shaft, a second rack meshing therewith, a second piston secured to the second rack, and means for applying a predetermined fluid pressure resistance to movement of the second piston.

9. Mechanism for dressing a rotary wheel for grinding gears comprising a support, a pair of shafts journaled in said support with their axes inclined to one another at an angle equal to the included angle between opposite side surfaces of the wheel to be dressed, an arm secured to each of said shafts, a dressing tool secured to each of said arms in position to dress opposite sides of the wheel, respectively, means for oscillating said shafts comprising a piston mounted on said support between said shafts, a pair of racks secured to opposite sides of the piston, a spur gear secured to each shaft and meshing with one of the racks, and means for applying fluid pressure selectively to opposite sides of the piston, and means for taking up backlash between the racks and gears comprising an auxiliary gear secured to each shaft, an auxiliary rack meshing with each of the auxiliary gears, an auxiliary piston secured to each of the auxiliary racks, a cylinder in which each of the auxiliary pistons is reciprocable, and a substantially closed hydraulic circuit connecting the two cylinders in such way that movement of one of the auxiliary pistons in its cylinder under actuation of the auxiliary rack and gear is resisted by the pressure of the motive fluid being exhausted from the other cylinder by the movement of the other auxiliary piston in the latter cylinder.

10. Mechanism for dressing a rotary annular grinding wheel for grinding gears comprising a support, a shaft journaled therein, an arm secured to the shaft, a dressing tool secured to the arm, means for oscillating said shaft to swing the dressing tool in a circular arcuate path lying wholly in a plane perpendicular to the axis of said shaft, and means for adjusting said support in the direction of the axis of the wheel, means for adjusting said support in a direction at right angles to a plane containing the axis of the wheel and parallel to the axis of said shaft, and means for adjusting said support in a direction at right angles to both of the first named adjustments.

11. The method of dressing a curved surface on the side of a grinding wheel which comprises moving a dressing tool across the side of the wheel in a circular arcuate path which lies wholly in a plane perpendicular to a fixed axis inclined at other than right angles to a plane tangent to the said side of the wheel at a mean point of contact of the dressing tool with the said side of the wheel.

12. The method of dressing a concave surface on the side of a grinding wheel which comprises positioning an oscillatory dressing tool in engagement with the side of the wheel so that the axis about which the tool swings is inclined at an acute angle to a plane tangent to the side surface of the wheel at a mean point of contact of the tool with said side surface, and swinging said tool on its axis to move the tool across the side of the wheel in a circular arcuate path which lies wholly in a plane perpendicular to said axis.

13. The method of dressing a convex surface on the side of a grinding wheel which comprises positioning an oscillatory dressing tool in engagement with the side of the wheel so that the axis about which the tool swings is inclined at an obtuse angle to a plane tangent to the said side of the wheel at a mean point of contact of the tool with said side surface, and swinging said tool on its axis to move the tool across the side of the wheel in a circular arcuate path which lies wholly in a plane perpendicular to said axis.

ERNEST WILDHABER.
LEONARD O. CARLSEN.